United States Patent
Ahner et al.

(10) Patent No.: US 6,852,062 B1
(45) Date of Patent: Feb. 8, 2005

(54) DRIVE SYSTEM FOR MOTOR VEHICLES

(75) Inventors: Peter Ahner, Boeblingen (DE);
Manfred Ackermann, Oppenweiler (DE)

(73) Assignee: Robert Bosch GmbH, Stuttgart (DE)

( * ) Notice: Subject to any disclaimer, the term of this patent is extended or adjusted under 35 U.S.C. 154(b) by 643 days.

(21) Appl. No.: 09/806,101

(22) PCT Filed: Jul. 19, 2000

(86) PCT No.: PCT/DE00/02347
§ 371 (c)(1),
(2), (4) Date: Nov. 13, 2002

(87) PCT Pub. No.: WO01/07280
PCT Pub. Date: Feb. 1, 2001

(30) Foreign Application Priority Data

Jul. 27, 1999 (DE) .......................................... 199 34 790

(51) Int. Cl.$^7$ ............................. B60K 5/08; B60K 1/00; B60K 6/00
(52) U.S. Cl. ............................................ 477/2; 180/65.2
(58) Field of Search .................... 477/2, 3, 7; 180/65.2, 180/65.3

(56) References Cited

U.S. PATENT DOCUMENTS

| 3,487,721 | A | * | 1/1970 | Hiersig ............................ 74/661 |
| 4,585,949 | A | * | 4/1986 | Takahashi .................... 290/1 C |
| 5,492,189 | A | * | 2/1996 | Kriegler et al. ............. 180/65.2 |
| 5,495,912 | A | * | 3/1996 | Gray et al. ................... 180/165 |
| 6,306,056 | B1 | * | 10/2001 | Moore ............................. 475/5 |

FOREIGN PATENT DOCUMENTS

| DE | 3316728 A1 | * | 9/1984 | ........... F02D/25/04 |
| DE | 35 22 988 A | | 6/1986 | |
| DE | 197 05 610 A | | 12/1997 | |
| DE | 197 50 497 A | | 1/1999 | |
| DE | 199 53 940 A | | 5/2000 | |
| DE | 199 53 940 A1 | | 5/2000 | |
| JP | 57076263 A | * | 5/1982 | ........... F02N/15/00 |

* cited by examiner

*Primary Examiner*—Tisha Lewis
(74) *Attorney, Agent, or Firm*—Michael J. Striker

(57) ABSTRACT

A drive system for motor vehicles, in particular having an internal combustion engine (13) as a main drive, a driving clutch (15), a transmission (16) and at least one drive axle (17) in the main drive train (10), furthermore having a secondary drive train (11) and having secondary assemblies (19) which can be disposed in the secondary drive train (11), the secondary drive train (11) being capable of being coupled to the main drive train, and having an electric machine operating as a starter generator (20), characterized in that the secondary drive train (11) has its own secondary assembly drive (22) which can be coupled to the starter generator (20), and that the secondary assembly drive (22) and the starter generator (20) can be coupled to the driving axle (17) of the motor vehicle either individually or jointly, with or without the main drive (13), to drive the motor vehicle.

24 Claims, 1 Drawing Sheet

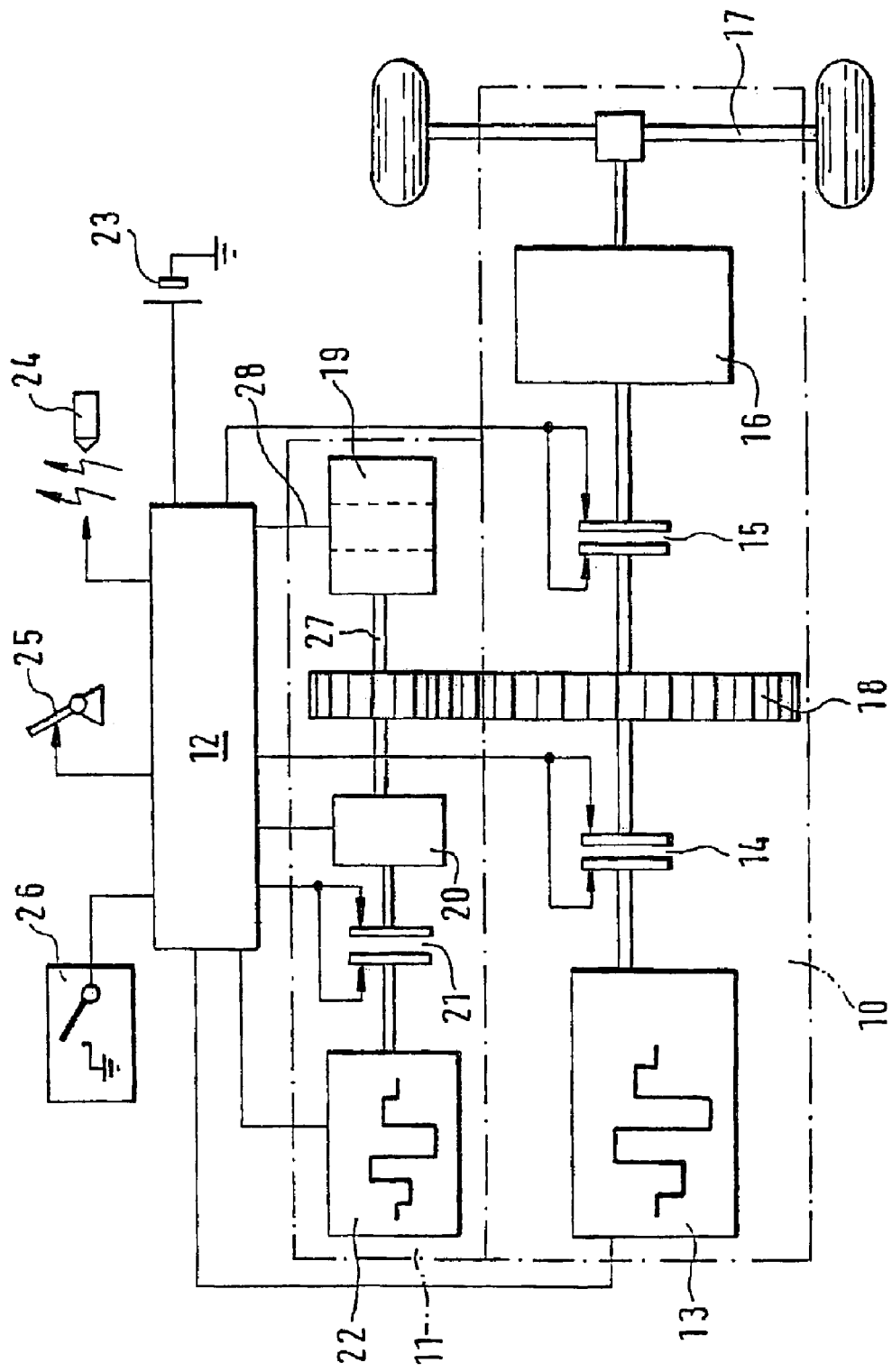

DRIVE SYSTEM FOR MOTOR VEHICLES

BACKGROUND OF THE INVENTION

The invention relates to a drive system for motor vehicles.

In the very great majority of motor vehicles, an internal combustion engine is provided in their drive system as the main drive; this engine is coupled to one or more driving axles in the main drive train via a driving clutch and a transmission. Secondary assemblies, such as pumps, compressors, air conditioners, and electric consumers, such as power controls, are increasingly used in motor vehicles; they are driven via a secondary drive train that is coupled with the main drive train of the motor vehicle.

It is also known, for reducing environmental pollution, to use hybrid drives in motor vehicles; then the drive system has both an internal combustion engine and an electric machine for selectively driving the motor vehicle. Once again, the internal combustion engine and the electric machine are located in the main drive train of the motor vehicle, and only the internal combustion engine is used to drive the secondary assemblies.

From German Patent Disclosure DE 197 50 497 A1, it is also known to operate the secondary assemblies in the motor vehicle with the main drive of the motor vehicle via an intermediate gear; the secondary assemblies also have an electric machine as a starter generator, which on the one hand for starting the engine operates as an electric motor in the main drive train and on the other, for supplying the on-board vehicle electrical system, operates in the generator mode for charging an accumulator battery.

Such vehicle concepts, optimized especially with regard to fuel consumption, require among other things that the engine in the main drive train be shut off when the vehicle is stopped at traffic lights; that is, they require a start and stop mode and a shutoff or disengagement of the engine in overrunning phases, that is, in the inertia-utility mode. Compared with conventional vehicles, this means approximately ten times as many starting cycles, that is, from 400,000 to 600,000 starting cycles. The additional starting cycles are essentially repeat starts, that is, starts with the engine at operating temperature. For these repeat starts, especially fast, quiet starting is demanded. On the other hand, in these motor vehicles, for reasons of comfort, up to five times more generator power is needed compared with conventional vehicles, especially since electrically triggered and operated secondary assemblies function more favorably in terms of consumption. In this case, generator power levels of more than 5 kW are desired. In addition, this power is sometimes needed even in engine idling, that is, for crankshaft speeds of less than 700 rpm, which cannot be achieved with the claw pole generators that are conventional today.

To make it possible for the starting and power demands in the generator mode to be met with a so-called starter generator, it is known from German Patent Disclosure DE 197 05 610 A1, to employ so-called impulse starting to reduce the starting power, and to continue to use a conventional, additional starter for extremely low starting temperatures.

In terms of the charge balance, however, concepts that use a starter generator to start the engine in the main drive train both in cold starting and in the start and stop mode are extremely critical, especially, since when the electrical system power is high, it is impossible to predict what driving and consumption cycles will have to be handled. The case where there is a demand on an air conditioner while the vehicle is stopped is even less favorable, since the conventional air conditioner compressor would have to be operated from the accumulator battery of the motor vehicle. This requires a cost-intensive design with high capacity and performance, which in turn tends to increase fuel consumption.

It has also already been proposed, in the earlier German Patent Application DE 198 529 41.4 that the secondary assemblies be driven by an additional secondary assembly drive, embodied as a smaller internal combustion engine; these secondary assemblies also include a starter generator, which is used in the generator mode on the one hand to supply the vehicle electrical system and on the other in the motor mode to start the secondary assembly drive. The main drive is started from the secondary assembly drive via a clutch and is then decoupled from the secondary assembly drive again.

SUMMARY OF THE INVENTION

The invention seeks on the one hand to optimize the drive system for motor vehicles in view of the applicable driving power demand and on the other to optimize the power demand for driving the secondary assemblies.

ADVANTAGES OF THE INVENTION

The drive system for motor vehicles according to the invention, has the advantage that with the main drive, the secondary assembly drive, and the starter generator, three components for optimizing the power balance in the motor vehicle can be used, especially for optimizing fuel consumption, both individually and in combination, both for driving the motor vehicle and for supplying the secondary assemblies. With this drive concept, beyond a medium driving power demand, a powerful internal combustion engine is to be used in the main drive train in particular, while an internal combustion engine of lesser power is to be used in particular to drive the secondary assemblies. This secondary assembly drive also serves to start the engine in the main drive train, or as a drive at low power demand both to support the engine in the main drive train and at very high driving power demand (kick-down). With the provisions according to the invention, not only comfort-related requirements such as independent air conditioners, but also fast, quiet starting and high on-board electrical system power, as well as sharply reduced fuel consumption, can all be achieved at substantially less expense cost than in motor vehicles with hybrid drives, by choosing the optimal operating mode. The drive system according to the invention always allows flexible drive and on-board electrical system management, so that on the one hand the accumulator battery of the motor vehicle, as an electrical energy storage means, can be dimensioned relatively small, and on the other the most favorable combination of the three drives in terms of efficiency and exhaust emissions can always be chosen.

Vehicles with the drive system of the invention have increased operating reliability and enhanced comfort. If the main drive fails, the mobility of the vehicle is maintained by the secondary assembly drive —although to a restricted extent.

To avoid the coupled motion of turned-off drives, when the main drive or secondary assembly drive is turned off, this turned-off drive is advantageously capable of being decoupled from whichever drive of the motor vehicle has been turned on.

In view of the graduation in the power of the three drives, it is thus especially advantageous if the secondary assembly drive is a further internal combustion engine, whose power is less than half the power of the internal combustion engine in the main drive train.

In this graduation, for starting the secondary assembly drive, the secondary assembly drive is advantageously to be coupled to the starter generator via a shift clutch. Furthermore, for starting the main drive, the main drive is expediently to be coupled to the running secondary assembly drive.

An economical embodiment is obtained in that the secondary assembly drive and the starter generator are connected to the main drive train via an intermediate gear.

Optimal force introduction from the starter generator for starting the secondary assembly drive via the shift clutch is obtained in that the intermediate gear is connected on the inlet side to the starter generator and on the outlet side can be decoupled both from the transmission via the driving clutch and from the main drive in the main drive train via an auxiliary clutch.

By temperature detection at the secondary assembly drive, the starting operation of the secondary assembly drive can be switched over between direct starting and impulse starting as a function of temperature. For direct starting of the secondary assembly drive, the driving clutch and the auxiliary clutch in the main drive train are opened, and the shift clutch in the secondary drive train is closed. For impulse starting of the secondary assembly drive, the driving clutch and the auxiliary clutch in the main drive train are opened, and the shift clutch in the secondary drive train is to be closed abruptly only after the starter generator has run up to speed.

The starting operation for the internal combustion engine in the main drive train of the motor vehicle can also be switched over as a function of temperature between direct starting and impulse starting by means of a temperature detection, and this starting operation also takes place as a function of temperature selectively by means of the starter generator and/or by means of the secondary assembly drive. For direct starting of the main drive with the secondary assembly drive running, the driving clutch is opened, and the auxiliary clutch and the shift clutch are closed. For the impulse starting of the main drive with the secondary assembly drive running, the driving clutch is opened, the shift clutch is closed, and the auxiliary clutch should be closed only after the intermediate gear has run up to speed.

BRIEF DESCRIPTION OF THE DRAWINGS

Further individual features of the invention are described in further detail in the exemplary embodiment described below, in conjunction with the associated drawing.

The drawing schematically shows a drive system according to the invention for motor vehicles, having an internal combustion engine in the main drive train and having both a starter generator and a secondary assembly drive in the secondary drive train.

DESCRIPTION OF THE PREFERRED EMBODIMENT

From the drawing, a drive system for motor vehicles can be seen that comprises a main drive train 10 and a secondary drive train 11, as well as a common electric controller and supply means 12 in the on-board electrical system of the motor vehicle. The main drive train includes an internal combustion engine 13 as its main drive, an auxiliary clutch 14 at the power takeoff of the engine 13, a driving clutch 15, and a conventional transmission 16 downstream of it, whose output shaft is solidly connected to a driving axle 17 of the motor vehicle. Between the driving clutch 15 and the auxiliary clutch 14 in the main drive train 10, there is an intermediate gear 18, which connects the main drive train 10 to the secondary drive train 11. To the extent that they are not driven electrically, at least one secondary assembly 19 to be driven, and optionally operating even if the main drive is shut off or the vehicle is stopped, such as a coolant pump, an oil pump for the lubricant system in the motor vehicle, a pump for the power steering, and a compressor for an air conditioner, are located in the secondary drive train 11. For the sake of better rpm adaptation to their optimal operating range, or for reasons of installation space, not only these secondary assemblies 19, but also as the starter generator 20 and the secondary assembly drive 22, can be connected to the secondary drive train 11 by means of step-up gears. The intermediate gear 18 can also be provided with a step-up means for this purpose. If the secondary assemblies 19 are driven electrically, then the mechanical coupling 27 is omitted. In that case, the secondary assemblies receive their energy supply via the electrical connection 28. Also located in the secondary drive train 11 is a starter generator 20, which is solidly connected to the intermediate gear 18 and to which, via a shift clutch 21, a secondary assembly drive 22 is coupled. Serving as the secondary assembly drive 22 here is a further internal combustion engine, whose power is less than half the power of the internal combustion engine 13 in the main drive train 10. The electric controller and supply means 12 is connected via electrical lines to the auxiliary clutch 14, the driving clutch 15, the shift clutch 21, the starter generator 20, and in part the secondary assemblies 19, among other elements. It is furthermore connected to the engine 13 and the secondary assembly drive 22 for the sake of temperature detection. In addition, an accumulator battery 23 as an electrical energy storing means, a remote control 24, a gas pedal sensor 25, and a door contact 26 in the driver door of the motor vehicle are connected to the electric controller and supply means 12 in the on-board electrical system of the motor vehicle.

The mode of operation of the drive system according to the invention will now be described in further detail. By the triggering of the three aforementioned clutches 14, 15 and 21, the intermediate gear 18 can be decoupled completely from the engine 13 as a main drive on the one hand, and from the driving axle 17 on the other, by opening of the driving clutch 15 and the auxiliary clutch 14. Thus when the vehicle is stopped, by way of the secondary assembly drive 22 and the starter generator 20 with the shit clutch 21 closed, not only can current be generated, but mechanical power can also be output to the secondary assemblies 19. As a result, flexible supply to electrical and other consumers that is optimal in terms of consumption is achieved. In the normal travel mode, conversely, the secondary assemblies 19 are driven by the main drive train with the engine 13, and the starter generator 20 is operated as needed in the generator mode for charging the accumulator battery 23; see also Table, Case 1.

The secondary drive train 11, conversely, is used to drive the motor vehicle in the low-load range of the vehicle, in that with the driving clutch 15 closed and the auxiliary clutch 14 opened, the engine 13 is shut off, and the drive power of the motor vehicle is brought to bear by the secondary assembly drive 22 with the shift clutch 21 closed; see Table, Case 2. As a result, for a standardized European trip cycle, over a 30% savings in fuel consumption can be attained, compared with operation using the engine 13 in the main drive train 10.

By shutting off the engine 13 during idling or in the low-load range of the motor vehicle and under corresponding peripheral conditions, such as charge capacity of the accumulator battery 23, the secondary assembly drive 22 can be turned off as well, so that with the shift clutch 21 open and the clutches 14 and 15 open, only the starter generator 20 in the motor mode is capable of taking over the drive of the secondary assemblies 19. In this mode of operation, when the vehicle is stopped, noise and vehicle vibration as well as exhaust emissions can all be reduced markedly.

When the vehicle is rolling in the overrunning mode, depending on the power demand in the on-board vehicle electrical system and the power demand of the secondary assemblies 19, both the engine 13 and the secondary assembly drive 22 can be switched off and uncoupled via the clutches 14 and 21, respectively. Then the drive of the secondary assemblies 19 and the starter generator 20 in the generator mode for charging the accumulator battery 23 (Table, Case 4) continues to be effected via the driving clutch 15 and the intermediate gear 18. In the event of a high electrical power demand or an inadequately charged accumulator battery 23, however, the secondary assembly drive 22 can still be added via the shift clutch 21.

If with the vehicle at a stop and the engine 13 switched off an air conditioner is being operated as one of the secondary assemblies 19, then a mechanical or electrical mode becomes possible by turning on the secondary assembly drive 22, and via the closed shift clutch 21, either the starter generator 20 is driven in the generator mode and the air conditioner is driven mechanically via the secondary drive train 11, or the air conditioner is driven electrically by way of the electrical energy generated in the starter generator 20. The driving clutch 15 and auxiliary clutch 14 are then open; see Table, Case 3. The same conditions for the operation of secondary assemblies 19 exist when the vehicle is stopped at a traffic light or in similar cases; see Table, Case 5. For the case in which the secondary assemblies 19 are not driven mechanically, no mechanical coupling 27 is needed. Instead, the energy supply takes place via an electrical connection 28.

If the vehicle is to be accelerated from a stop, which is comparable to a situation at a traffic light, then to reduce noise and exhaust emissions, it is advantageous to the immediate vicinity of the traffic light for some of the drive power to be produced by the starter generator 20, since it is silent and does not produce exhaust gases. Simultaneously, the engine 13 and secondary assembly drive 22 are for instance turned on, and all the drive assemblies are coupled to one another via the clutches 14 and 21, with the driving clutch 15 initially open, as in the Table, Case 6, so that the vehicle can then be put in motion via the closed driving clutch 15.

If conversely the power demand of the motor vehicle requires that the engine 13 be turned on in addition, then the secondary assembly drive 22 is preferably turned off whenever the efficiency of the engine 13 is improved as a result of the additional load on the secondary assemblies 19.

The engine 13 and the secondary assembly drive 22 are disposed in close integration so they can share a combined oil-and-coolant system and a unified exhaust system, so that preheating of the oil by the secondary assembly drive 22 also has advantages for the engine 13 additionally turned on later. To improve the exhaust composition, the lambda sensor, known per se, can be used for both drives; this sensor continues to be kept at its optimal operating temperature even in the start and stop mode.

In the exemplary embodiment described here, the engine 13 should have a maximum power of 150 kW. The secondary assembly drive 22, conversely, is designed for a lower maximum power of 12 kW. The starter generator 20 in the motor mode has a maximum power output of 3 kW. The result for the engine 13 and the secondary assembly drive 22 is a graduation that is comparable to the power gradient of the so-called drag moments upon starting of the cold or warm engine 13 and secondary assembly drive 22. The warm drag moment of the secondary assembly drive 22 is about 5 Newton-meters here; conversely, the warm drag moment of the engine 13 is 50 Newton-meters.

For starting the drive system of the invention, first the secondary assembly drive 22 is started dynamically; that is, as a function of the measured temperature of the secondary assembly drive 22, the secondary assembly drive is started with direct starting or with impulse starting by the starter generator 20. When the secondary assembly drive 22 is warm, dynamic direct starting is performed, in that the driving clutch 15 and the auxiliary clutch 14 are opened and the shift clutch 21 is closed, and then the starter generator 20 is turned in the motor mode. The cold secondary assembly drive 22 is started with dynamic impulse starting, in that the driving clutch 15, auxiliary clutch 14 and shift clutch 21 are opened and the starter generator 20 is turned in the motor mode. Only after the starter generator 20 runs up to speed at approximately 1000 to 1500 rpm is the shift clutch 21 then closed, for starting the secondary assembly drive 22. The cold engine 13 can then be started. In this case fast impulse starting is possible in that the sum of the drive moments of the secondary assembly drive 22 and the starter generator 20 in the motor mode, plus the torques of the centrifugal masses of the intermediate gear 18, with the driving clutch 15 open and the shift clutch 21 closed, acts upon the engine 13 of the main drive train 10 with the closure of the auxiliary clutch 14 and starting thus occurs. When the engine 13 is warm, impulse starting with the starter generator 20 alone is also possible; the secondary assembly drive 22 is optionally turned off then and the shift clutch 21 is opened.

The drive system also allows purely electrical operation of the vehicle when the travel power demand is very low, for instance in maneuvering. Here only the starter generator 20 communicates with the driving axle 17 of the vehicle, via the intermediate gear 18 and the driving clutch 15. For this mode, however, the electric controller and supply means 12 must monitor not only the charge state of the accumulator battery 23 but also the power demand of the secondary assemblies 19, so that if necessary the secondary assembly drive 22 can be started as well.

The travel readiness of the motor vehicle can be enhanced by providing that as soon as the driver door is opened, the secondary assembly drive 22 is started via the door contact 26. To preheat both the motor vehicle itself and the oil in an oil system shared by the engine 13 and the secondary assembly drive 22, provision is made for starting the secondary assembly drive 22 via the remote control 24 by enabling the starter generator 20 and the shift clutch 21 to be triggered via the remote-controlled electric controller and supply means 12.

The choice of operating mode of the motor vehicle drive, that is, between the engine 13 as the main drive and/or the secondary assembly drive 22 and/or the starter generator 20, is made via the electric controller and supply means 12, as a function of the power demand of the motor vehicle. In the simplest way, the choice of operating mode is made as a function of the drive pedal position of the motor vehicle, by means of the gas pedal sensor 25. The electric controller and supply means 12 includes the entire vehicle and battery management system for controlling the three clutches 14, 15 and 21 and for controlling the starter generator 20. The Table below lists some preferred states of the components of the drive system of the invention as a function of the applicable operating mode. However, quite flexible deviations can be made from this layout of states via the engine management system, as a function of the battery state and the requisite mechanical and electrical power levels, without risking the low consumption values.

| Type of operation | Driving clutch 15 | Auxiliary clutch 14 | Shift clutch 21 | Secondary assembly drive 22 | Internal combustion engine 13 | Starter generator 20 |
|---|---|---|---|---|---|---|
| High partial load to full load (Case 1) | closed | closed | open | OFF | ON | Generator mode |
| Low load (Case 2) | closed | open | closed | ON | OFF | As needed |
| Air conditioner on, vehicle stopped (Case 3) | open | open | closed | ON | OFF | Generator mode |
| Vehicle rolling, overrun-ning (Case 4) | closed | open | open | OFF | OFF | Generator mode |
| Stopped at traffic light (Case 5) | open | open | closed | ON | OFF | Generator mode |
| Starting from traffic light (Case 6) | open | closed | closed | ON | ON | Motor mode |

What is claimed is:

1. A drive system for motor vehicles, in particular having an internal combustion engine (13) as main drive, a driving clutch (15), a transmission (16) and at least one drive axle (17) in the main drive train (10), furthermore having a secondary drive train (11) and having secondary assemblies (19) which can be disposed in the secondary drive train (11), the secondary drive train (11) being capable of being coupled to the main drive train, and having an electric machine operating as a starter generator (20), characterized in that the secondary drive train (11) has its own secondary assembly drive (22) which can be coupled to the starter generator (20), and that the secondary assembly drive (22) and the starter generator (20) can be coupled to the driving axle (17) of the motor vehicle either individually or jointly, with or without the main drive (13), to drive the motor vehicle.

2. The drive system of claim 1, characterized in that the main drive (13) or the secondary assembly drive (22) can be decoupled from the respectively selected drive (13 or 20 or 22) of the motor vehicle.

3. The drive system of claim 1, characterized in that the main drive and the secondary assembly drive (22) are each an internal combustion engine, and the power of the secondary assembly drive (22) is less than half the power of the engine (13) in the main drive train (10).

4. The drive system of claim 1, characterized in that for starting, the secondary assembly drive (22) is coupled to the starter generator (20) via a shift clutch (21).

5. The drive system of claim 4, characterized in that for starting, the main drive (13) can be coupled to the running secondary assembly drive (22).

6. The drive system of claim 1, characterized in that the secondary assembly drive (22) and the starter generator (20) are connected to the main drive train (10) via an intermediate gear (18).

7. The drive system of claim 6, characterized in that the intermediate gear (18) is connected on an inlet side to the starter generator (20) and on an outlet side can be decoupled both from the transmission (16) via the driving clutch (15) and from the main drive (13) in the main drive train (10) via an auxiliary clutch (14).

8. The drive system of claim 7, characterized in that in starting of the secondary assembly drive (22), the driving clutch (15) and the auxiliary clutch (14) in the main drive train (10) are opened.

9. The drive system of claim 8, characterized in that for direct starting of the secondary assembly drive (22), the driving clutch and the auxiliary clutch (15, 14) are opened, and the shift clutch (21) is closed.

10. The drive system of claim 8, characterized in that for impulse starting of the secondary assembly drive (22), the auxiliary clutch, driving clutch and shift clutch (14, 16, 21) are opened, and that the shift clutch (21) should be closed only after the starter generator (20) has run up to speed.

11. The drive system of claim 9, characterized in that by means of detection of the temperature of the secondary assembly drive (22), its starting operation can be switched over between direct starting and impulse starting as a function of temperature.

12. The drive system of claim 7, characterized in that for direct starting of the main drive (13) with the secondary assembly drive (22) running, the driving clutch (15) is opened, and the auxiliary clutch (14) and the shift clutch (21) are closed.

13. The drive system of claim 7, characterized in that for the impulse starting of the main drive (13) with the secondary assembly drive (22) running, the driving clutch (15) is opened, the shift clutch (21) is closed, and the auxiliary clutch (14) should be closed only after the intermediate gear (18) has run up to speed.

14. The drive system of claim 12, characterized in that by means of detection of the temperature of the main drive (13), its starting operation can be switched over between direct starting and impulse starting as a function of temperature.

15. The drive system of claim 14, characterized in that both in direct starting and in impulse starting of the main drive (13), the starter generator (20) in the motor mode is jointly activated.

16. The drive system of claim 7, characterized in that for starting the secondary assembly drive (22), the starter generator (20) and the shift clutch (21) can be triggered via a remote-controllable electric controller and supply means (12).

17. The drive system of claim 7, characterized in that for starting the secondary assembly drive (22), the starter generator (20) and the shift clutch (21) can be triggered when the driver door is opened via a door contact (26).

18. The drive system of claim 1, characterized in that when a travel power demand is very low and a battery charge is adequate, only the starter generator (20) is employed for driving the motor vehicle, by means of an electric controller and supply means (12).

19. The drive system of claim 1, characterized in that when a driving power demand is low, only the secondary assembly drive (22) is used for driving the motor vehicle.

20. The drive system of claim 1, characterized in that when a driving power demand is high, the secondary assembly drive (22) and main drive (13) are jointly used for driving the motor vehicle.

21. The drive system of claim 1, characterized in that when a driving power demand is briefly at maximum, both the secondary assembly drive (22) and main drive (13) as well as the starter generator (20) in the motor mode are used for driving the motor vehicle.

22. The drive system of claim 18, characterized in that the choice of operating mode of the motor vehicle drive, that is, the choice between the main drive (13) and/or the secondary assembly drive (22) and/or the starter generator (20), is made via an electric controller and supply means (12).

23. The drive system of claim 22, characterized in that the choice of operating mode is made as a function of the position of the gas pedal of a motor vehicle, which is detected via a gas pedal sensor (25).

24. The drive system of claim 1, characterized in that the secondary assemblies (19) are drivable either mechanically by the secondary drive train (11) or electrically.

* * * * *